US006147928A

United States Patent [19]

Onizuka et al.

[11] Patent Number: 6,147,928
[45] Date of Patent: Nov. 14, 2000

[54] ANTI-NOISE COMPONENT FOR FLAT CABLE

[75] Inventors: Masahiro Onizuka; Yutaka Saito; Yoshikazu Suto, all of Tokyo, Japan

[73] Assignee: TDK Corporation, Tokyo, Japan

[21] Appl. No.: 09/261,228

[22] Filed: Mar. 3, 1999

[30] Foreign Application Priority Data

Mar. 10, 1998 [JP] Japan .................................. 10-075073

[51] Int. Cl.7 ........................................................ G01V 1/22
[52] U.S. Cl. ................................................ 367/43; 367/23
[58] Field of Search ........................ 367/23, 43; 333/620, 333/184, 182, 181; 324/127; 336/92, 97, 127, 176

[56] References Cited

U.S. PATENT DOCUMENTS

| | | | |
|---|---|---|---|
| 3,778,759 | 12/1973 | Carroll | 367/43 |
| 4,636,752 | 1/1987 | Saito | 333/12 |
| 4,641,115 | 2/1987 | Bailey | 333/181 |
| 4,866,407 | 9/1989 | Ikeda | 333/184 |
| 4,873,505 | 10/1989 | Matsui | 336/92 |
| 5,095,296 | 3/1992 | Parker | 336/92 |
| 5,216,569 | 6/1993 | Brookhiser | 361/107 |
| 5,266,055 | 11/1993 | Naito et al. | 439/620 |
| 5,476,394 | 12/1995 | Sugihara et al. | 439/620 |
| 5,764,125 | 6/1998 | May | 336/92 |
| 5,801,602 | 9/1998 | Fawal et al. | 333/177 |
| 5,872,492 | 2/1999 | Boutros | 333/182 |
| 5,942,964 | 8/1999 | Takeuchi | 336/92 |

FOREIGN PATENT DOCUMENTS

| | | |
|---|---|---|
| 5-90779 | 4/1993 | Japan . |
| 7-273485 | 10/1995 | Japan . |
| 8-1328 | 1/1996 | Japan . |
| 9-22821 | 1/1997 | Japan . |
| 3045425 | 11/1997 | Japan . |
| 10-32395 | 2/1998 | Japan . |

*Primary Examiner*—Victor J. Taylor
*Assistant Examiner*—Jay Patidar
*Attorney, Agent, or Firm*—Oblon, Spivak, McClelland, Maier & Neustadt, P.C.

[57] ABSTRACT

An anti-noise component for a flat cable including a flat O-like ferrite core having a slit-like hole through which a flat cable is passed, and an openable and closeable case which covers the ferrite core while the slit-like hole is exposed through the case. Further, the case integrally has a coupling portion including a pawl for fixation to an apparatus on which the component is to be mounted.

22 Claims, 5 Drawing Sheets

ANTI-NOISE COMPONENT FOR FLAT CABLE

BACKGROUND OF THE INVENTION

The present invention relates to an anti-noise component for a flat cable, which is to be attached to a flat cable to suppress noises propagating through the flat cable.

Conventionally, an anti noise measure is taken by using a ferrite core in a cable connecting various electronic apparatuses. Such a cable includes a flat cable. Also in a cable of this kind, an anti noise measure is taken in the same manner.

As a ferrite core used for an anti noise measure in a flat cable, used is a flat O-like (flat ring-like) ferrite core 1 such as shown in FIG. 9 and having a slit-like hole 2 through which a flat cable FC is to be passed.

This ferrite core 1 is used while the flat cable FC is passed therethrough. When the cable is passed and no further measure is taken, the ferrite core is movable along the cable. When such movement once occurs, it is often that a desired noise reduction effect cannot be attained depending on the place to which the ferrite core is moved. Furthermore, the ferrite core may collide with the interior of an apparatus to which the cable is connected, and the ferrite core may be damaged or a circuit in the apparatus may be damaged.

These problems can be solved by fixing the ferrite core on the flat cable. This can be implemented by a method in which the ferrite core is directly fixed to the cable by means of an adhesive fixed to an apparatus housing or a circuit board which is in the vicinity of the core, by means of an adhesive tape or an adhesive agent.

However, these methods require much labor. In the case of using an adhesive agent, a long time period is required for solidifying the adhesive agent, and hence the ferrite core must be held until the adhesive agent is solidified. In these methods, when a ferrite core is to be taken out because of a certain reason such as a breakage of the ferrite core or a fault of the core, moreover, the work of removing the core requires very much labor in the same manner as fixation. Particularly, in the case where a ferrite core is fixed to a flat cable by means of an adhesive agent, the cable may be damaged, and it is often that the cable itself must be discarded.

In the case where the ferrite core is fixed to the interior of the apparatus housing or the circuit board by means of an adhesive agent, the flat cable is not damaged. When a shock is applied to the apparatus, a shock of a substantially same degree is applied also to the ferrite core because the ferrite core is directly fixed to the apparatus, with the result that the ferrite core may be damaged.

In order to solve these problems, a component 10 such as shown in FIG. 10 and for fixing a ferrite core has been proposed (produced by TOKIN Corporation, product name: FPD-CL-1 Camp). The component 10 is characterized in that it is attached to each of the end portions of a ferrite core 1 and can be fixed to an apparatus housing or a circuit board 15 by, for example, fastening of a bolt 13 and a nut 14 with using a hole 11 formed in the component 10.

In the case of using the prior art component of FIG. 10, however, there arises the following problem. When the ferrite core 1 is to be fixed onto the apparatus housing or the circuit board 15, the components 10 are attached to the ferrite core 1 and the fixing work must be then conducted while pressing the core 1 and the components 10 by hand. In other words, although the fixing work is simpler than that in the case of using an adhesive agent, the work still requires much labor. When the ferrite core is once fixed onto the circuit board and the core is to be then detached therefrom, the ferrite core can be detached from the circuit board, only after the whole of the assembly is detached therefrom.

SUMMARY OF THE INVENTION

In view of the problems of the prior art, it is an object of the invention to provide an anti-noise component for a flat cable in which the works of fixing and detaching a ferrite core to and from a flat cable that require very much labor in the prior art can be easily conducted and a shock applied to an apparatus is hardly directly transmitted to the ferrite core.

In order to attain the object, the anti-noise component for a flat cable of the invention comprises: a ferrite core having a slit-like hole through which a flat cable is passed; and an openable and closeable case which covers the ferrite core while the slit-like hole is exposed through the case, and the case integrally has a coupling portion for fixing to an apparatus on which the component is mounted.

In the anti-noise component for a flat cable, the case may consist of a first split case half, and a second split case half which is detachably disposed with respect to the first half.

The case may have a first split case half, a second split case half, and a hinge portion through which the first and second case halves are openably connected to each other, and a closed state may be maintained by an engaging portion which is disposed on a face opposed to the hinge portion.

The ferrite core may be configured by butting split core halves against each other.

According to the present invention, the anti-noise component for a flat cable of the invention has a ferrite core, and an openable and closeable case which cover the ferrite core, and the case integrally has a coupling portion for fixing to an apparatus on which the component is mounted. The component can be fixed to a housing of the apparatus or a circuit board by the coupling portion. Therefore, the ferrite core can be fixed to the case by housing the core in the case and then closing the case. According to this configuration, the anti-noise component for a flat cable of the invention can be attached to a flat cable, and positional relationships between the component and the cable can be maintained constant. Particularly, the component can be fixed to the apparatus housing or the circuit board. Even when vibration or a shock is applied to the apparatus, therefore, the anti-noise component of the invention is not moved.

In the fixing structure using the anti-noise component for a flat cable of the invention, the component is fixed to an apparatus housing or a circuit board with using the coupling portion of the case, and hence no force is applied to the flat cable. A signal line passing through such a flat cable is thin. If an excessive force is applied to the cable, therefore, the signal line may be broken. Consequently, it is preferable to apply no force to the flat cable. In the invention, since the flat cable is required only to be passed through the ferrite core, no force is applied to the flat cable and hence the possibility of breakage of a line is very low.

When the ferrite core is taken out from the anti-noise component for a flat cable of the invention, the core can be easily taken out by opening the closed case. Also when the anti-noise component attached to an apparatus housing or a circuit board is detached therefrom, the component can be easily detached by disengaging the coupling portion fixed with the apparatus housing or the circuit board.

When the case have the first split case half, the second split case half, and the hinge portion through which the first and second case halves are openably connected to each other, the case is integrated by joining the first and second case halves through the hinge portion. Therefore, the component can be easily handled. When the engaging portion which maintains the case to be in a closed state is disposed on the face opposed to the hinge portion, the case can be easily opened or closed.

Any material can be used as the material of the case. A metal or a resin may be used as the material. When a resin is used, the hinge portion can be molded integrally with the case and has high flexibility, and hence this is preferable. Furthermore, the ferrite core is covered by the case. Even when a shock is applied to the case, therefore, shock acting on the ferrite core is reduced by the elastic resin, thereby preventing the ferrite core from being damaged. The kind of the resin is not particularly restricted. A resin having flexibility is preferably used. Nylon which is a thermoplastic resin is preferably used, and, more preferably, 66 nylon is used.

DETAILED DESCRIPTION OF THE PREFERRED EMBODIMENTS

Hereinafter, embodiments of the anti-noise component for a flat cable of the invention will be described with reference to the accompanying drawings.

Figure 1:
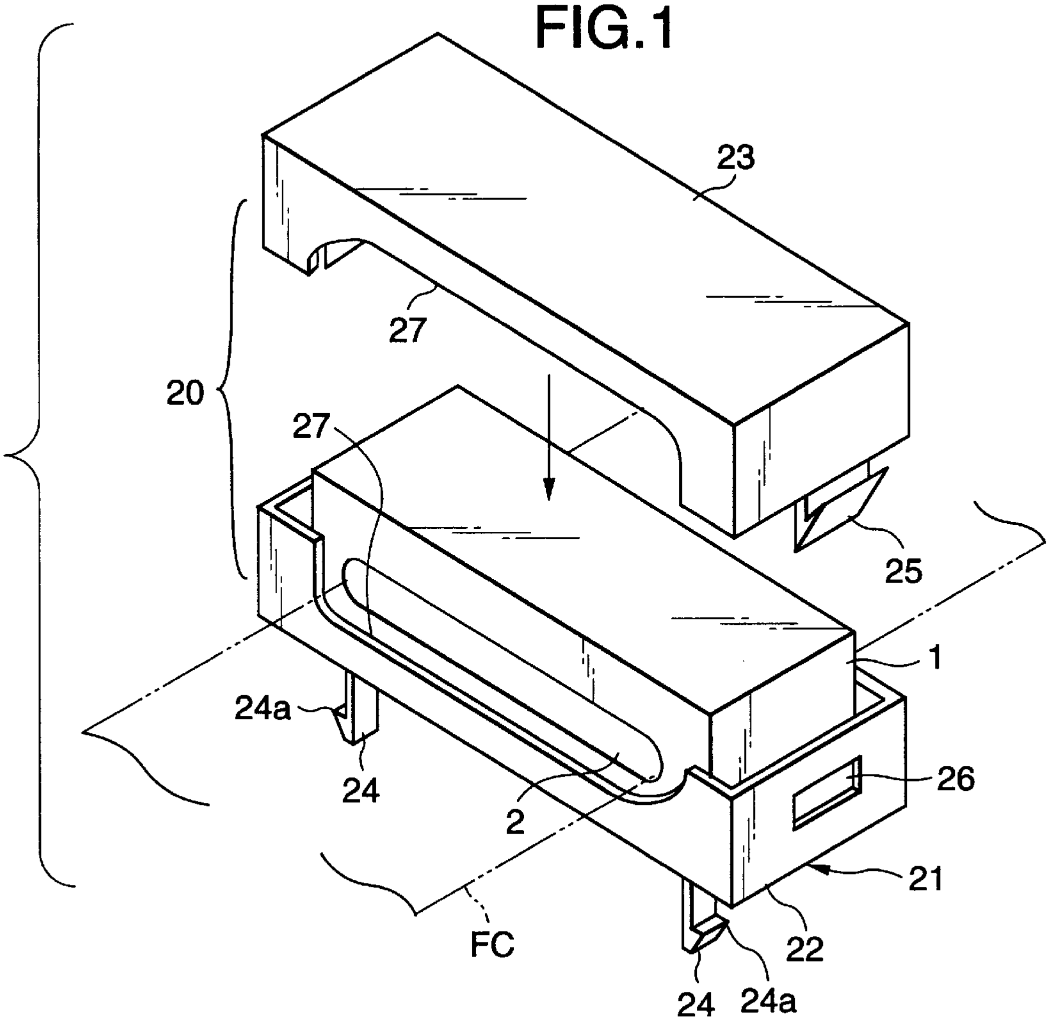
FIG. 1 is an exploded perspective view showing a first embodiment of the anti-noise component for a flat cable of the invention.
Figure 2:
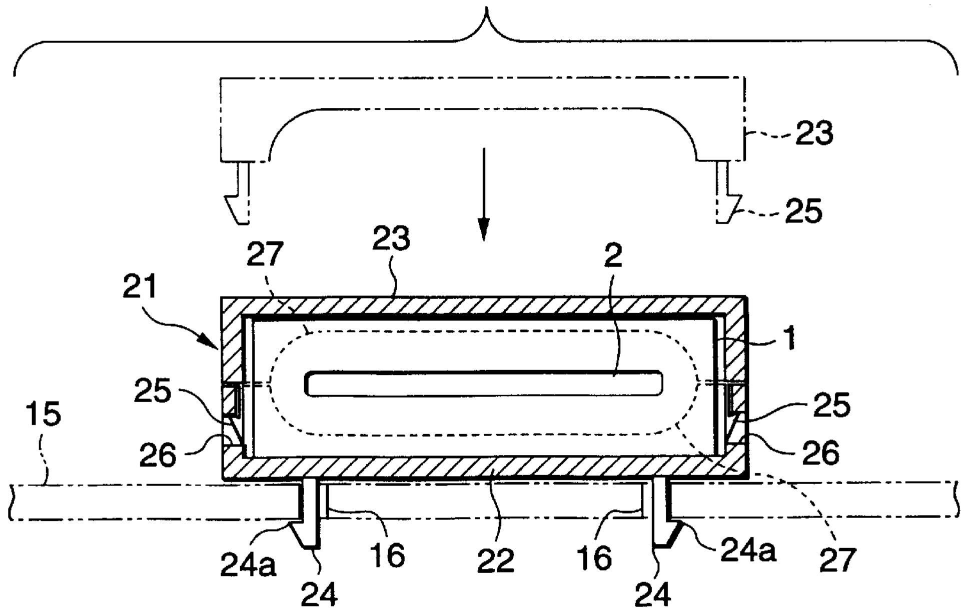
FIG. 2 is a front section view of the embodiment.

FIGS. 1 and 2 show a first embodiment of the anti-noise component for a flat cable of the invention. As shown in the figures, an anti-noise component 20 for a flat cable is configured by: a flat O-like (flat ring-like) ferrite core 1 having a slit-like hole 2 through which a flat cable FC is to be passed; and an openable and closeable case 21 which covers the ferrite core and which is made of, for example, a metal or a resin (preferably, 66 Nylon). The case 21 consists of a first split case half (case body portion) 22, and a second split case half (case lid portion) 23 which is detachable with respect to the first split case half. Coupling portions 24 for fixing to an apparatus on which the component is to be mounted are integrally formed on the bottom portion of the first split case half 22. As indicated by phantom lines in FIG. 2, the coupling portions 24 have a structure in which the coupling portions 24 are respectively inserted into mounting holes (or grooves) 16 of a housing of the apparatus or a circuit board 15 and then engaged therewith, so as to fix the case 21 with the apparatus housing or the circuit board. In each pair of the end faces of the first and second case halves 22 and 23, a pair of an engaging piece 25 and an engaging hole 26 with which the engaging piece can be engaged is formed as an engaging portion. When the case 21 is closed with butting the first and second case halves 22 and 23 against each other, the engaging pieces 25 and the engaging holes 26 are respectively coupled (engaged) with each other, so that the engaging portions maintain the case 21 closed.

It is important to configure the case 21 so that, when the case is closed, the slit-like hole 2 of the ferrite core 1 is exposed. In other words, cut-away portions 27 are formed in each of the first and second case halves 22 and 23, so as to form gaps that, when the case is closed, produce a space through which the flat cable FC can be passed.

The anti-noise flat cable component 20 can be attached to the flat cable FC in the following manner. The flat cable FC is passed through the slit-like hole 2 of the ferrite core 1, and the ferrite core 1 is then housed in the first split case half 22 of the case 21 in the opened state. Thereafter, the second split case half 23 is fitted to the first split case half 22 so as to close the case 21. When the coupling portions 24 are respectively inserted into the housing of the apparatus or the mounting holes (or grooves) 16 of the circuit board 15 as indicated by the phantom lines in FIG. 2, elastic pawls **24*a* of the coupling portions 24 are inserted into the holes and then engaged with the back side of the housing or the circuit board 15, whereby the case 21** can be fixed onto the apparatus housing or the circuit board.

According to the first embodiment, the following effects can be attained.

The anti-noise flat cable component 20 is characterized in that the component comprises: the ferrite core 1 having the slit-like hole 2 through which the flat cable FC is to be passed; and the openable and closeable case 21 which covers the ferrite core 1 while the slit-like hole 2 is exposed (the structure in which the first and second case halves 22 and 23 are combined to each other), and the case 21 integrally has the coupling portion 24 for fixing to the apparatus on which the component is to be mounted. Therefore, the ferrite core 1 can be easily fixed into the case 21 by housing the core into the case and then closing the case 21 (attaching the second split case half 23 to the first split case half 22). Furthermore, the case 21 can be coupled and fixed to the apparatus housing or the circuit board 15 with using the coupling portion 24. These fixing operations can be conducted with excellent workability. According to this configuration, the anti-noise component 20 for a flat cable can be attached to the flat cable FC, and positional relationships between the component and the cable FC can be maintained constant. Even when vibration or a shock is applied to the apparatus, particularly, the anti-noise component 20 is not moved because the component can be fixed to the apparatus housing or the circuit board.

In the anti-noise component 20 for a flat cable, since the coupling portions 24 which are integrated with the case 21 are inserted (fitted) into the apparatus housing or the circuit board so as to be fixed thereto, no force is applied to the flat cable FC. A signal line passing through such the flat cable is thin. When an excessive force is applied to the cable, therefore, the signal line may be broken. In the case of the anti-noise component 20 for a flat cable, since the flat cable FC is required only to be passed through the ferrite core 1, no force is applied to the flat cable and hence the possibility of breakage of a line is very low.

When the ferrite core 1 is to be taken out from the anti-noise component 20 for a flat cable, the core can be easily taken out by opening the closed case 21 (by detaching the second case half 23 from the first case half 23). Also when the anti-noise component 20 attached to the apparatus housing or the circuit board is to be detached therefrom, the component can be easily detached by disengaging the pawls 24*a* of the coupling portions 24 which are integrated with the case 21, from the apparatus housing or the circuit board. This can be conducted with very excellent workability, and there is no fear that a signal line in the cable is broken during the work.

In the case where the case 21 is made of an elastic resin, according to the configuration in which the ferrite core is covered by the case 21, even when a shock is applied to the case, a shock acting on the ferrite core 1 is reduced by the elastic resin, thereby preventing the ferrite core from being damaged.

Second Embodiment

Figure 3:
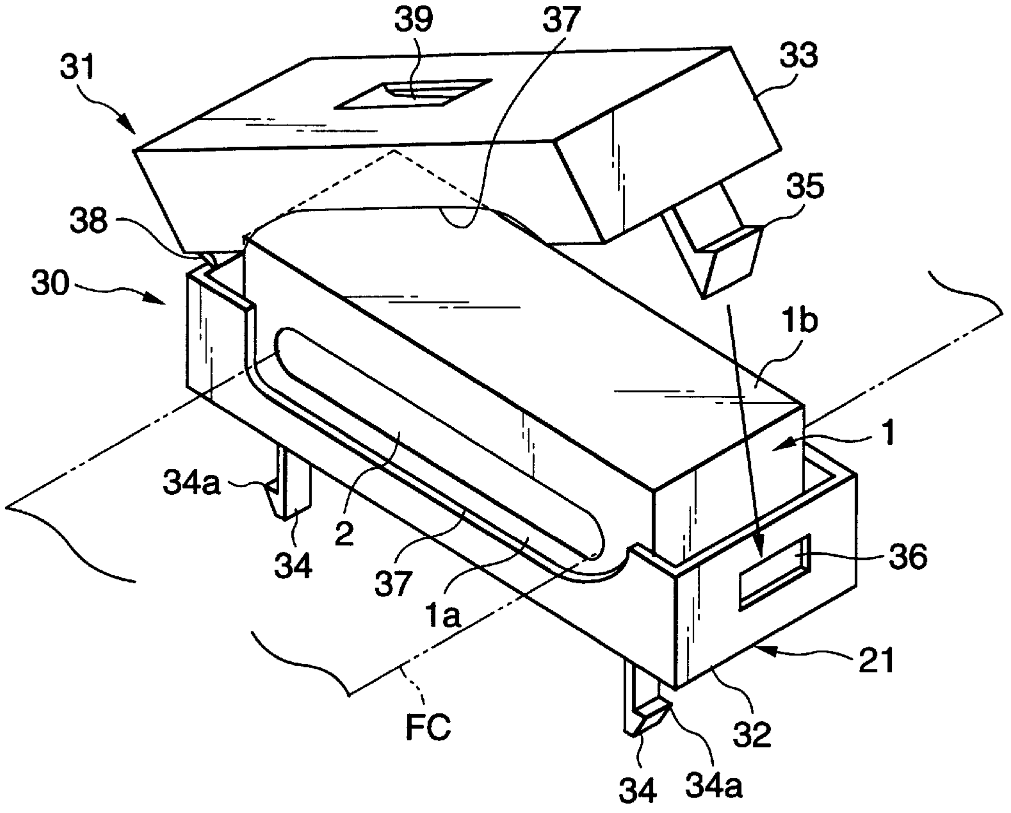
FIG. 3 is a perspective view of a second embodiment of the invention in a state where a case is opened.
Figure 4:
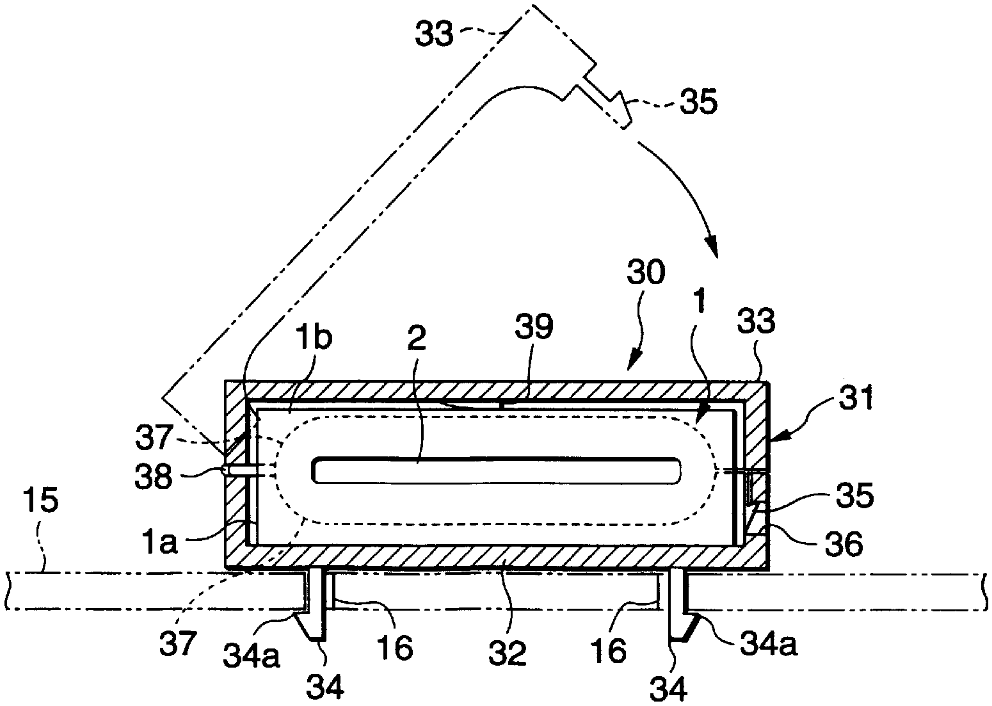
FIG. 4 is a front section view of the embodiment.

FIGS. 3 and 4 show a second embodiment of the invention. In the embodiment, an anti-noise component 30 for a flat cable is configured by: a ferrite core 1 in which split core halves 1*a* and 1*b* are butted against each other; and an openable and closeable case 31. The case consists of a first split case half (case body portion) 32 made of a flexible resin (preferably, 66 Nylon), or the like; a second split case half (case lid portion) 33; and a hinge portion 38 through which the first and second case halves are integrally openably connected to each other. Coupling portions 34 for fixing to an apparatus on which the component is to mounted are integrally formed on the bottom portion of the first split case half 32. As indicated by phantom lines in FIG. 4, the coupling portions 34 have a structure in which elastic pawls 34*a* of the coupling portions 34 are respectively inserted into mounting holes (or grooves) 16 of a housing of the apparatus or a circuit board 15 and then engaged therewith, so as to play a role of fixing the case 31 to the apparatus housing or the circuit board. In the end faces of the first and second case halves 32 and 33 which are opposed to the hinge portion 38, a pair of an engaging piece 35 and an engaging hole 36 which can be engaged with each other is formed as an engaging portion. When the case 31 is closed with butting the first and second case halves 32 and 33 against each other, the engaging piece 35 and the engaging hole 36 are coupled (engaged) with each other, so that the engaging portion maintains the case 31 closed.

In order to expose the slit-like hole 2 of the ferrite core 1 when the case 31 is closed, cut-away portions 37 are formed in each of the first and second case halves 32 and 33, so as to form gaps that, when the case 31 is closed, produce a space through which the flat cable FC can be passed. When the ferrite core 1 is configured by butting the split core halves 1*a* and 1*b* against each other, as shown in FIG. 4, an elastic pressing portion 39 is formed on the ceiling face of the second split case half 33, as spring means for pressing the split core halves 1*a* and 1*b* against each other.

In the second embodiment, the first and second case halves 32 and 33 constituting the case 31 are integrally joined to each other by the hinge portion 38. Therefore, the case 31 is integrally formed as one part, and hence the number of parts constituting the case is reduced from two to one. As a result, the handling of the case can be made easy, and labor for producing and managing the component can be largely simplified. As compared with a configuration wherein a case is completely split, also the workability of the assembling work can be improved. Since the pair of the engaging piece 35 for opening and closing the case and the engaging hole 36 which can be engaged therewith is formed as the engaging portion in the face opposed to the hinge portion 38, the opening and closing operations can be easily performed.

Even when cable connectors or the like have been already attached to the ends of the flat cable FC on which the split core halves 1*a* and 1*b* are to be combined with each other to constitute the ferrite core 1, the split core halves 1*a* and 1*b* can be attached to the flat cable FC by covering the cable with the split core halves from the upper and lower sides. Therefore, the application of the component can be widened. In this case, the disposition of the elastic pressing portion 39 allows the split core halves 1*a* and 1*b* to be maintained in a mutually closely contacted state. The other configuration, functions, and effects are identical with those of the first embodiment described above.

In the first or second embodiment, with respect to the coupling portions 24 or 34 integrated with the bottom portion of the first split case half 22 or 32, the structure is employed in which the holes (or grooves) 16 into which the coupling portions 24 or 34 can be inserted are formed in the apparatus housing or the circuit board 15, and, after the coupling portions are inserted into the holes (or grooves) 16, the pawls 24*a* or 34*a* at the tip end portions of the coupling portions 24 or 34 are engaged with the apparatus housing or the circuit board 15 by means of the elasticity of the resin or the like constituting the coupling portions 24 or 34. According to this configuration, the first split case half 22 or 32 can be fixed. In the structure of the coupling portions 24 or 34, it is important that the distance between the pawls 24*a* or 34*a* and the bottom portion of the case is set to be equal to or larger than the thickness of the apparatus housing or the circuit board 15 on which the component is to be mounted. This configuration is employed because of the following reason. When the distance is equal to or smaller than the thickness of the apparatus housing or the circuit board on which the component is to be mounted, the pawls 24*a* or 34*a* cannot be engaged with the opposite face of the apparatus housing or the circuit board and the component fails to be fixed.

Figure 5:
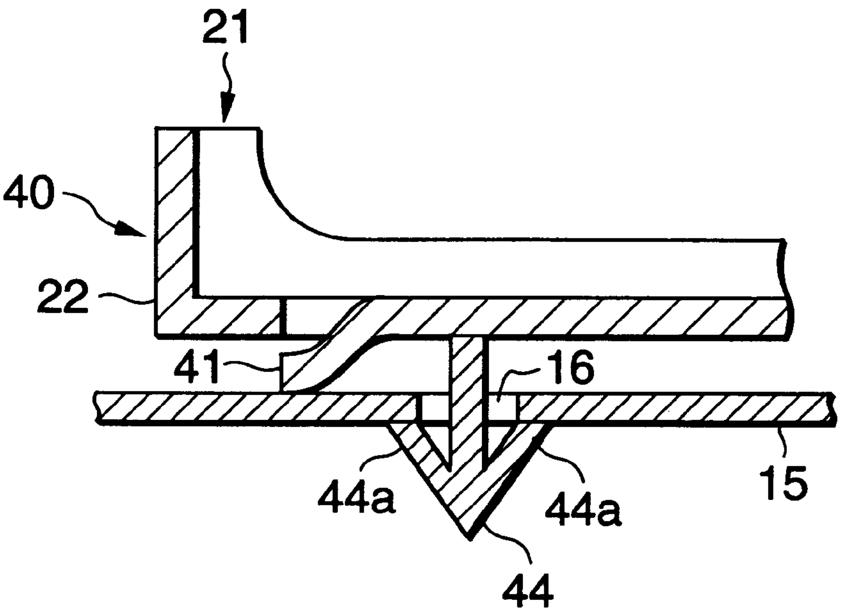
FIG. 5 is a section view showing main portions of a third embodiment of the invention.

When the thickness of the apparatus housing or the circuit board is equal to or smaller than the distance between the pawls 24*a* or 34*a* and the bottom portion of the case, a gap is formed between the pawls 24*a* or 34*a* and the bottom portion of the case as a result of the fixation. This gap may cause the anti-noise component 20 or 30 to rattle. An anti-noise component for a flat cable and having configuration which can solve this problem will be described with reference to FIG. 5 as a third embodiment of the invention. According to the embodiment, in the anti-noise component 40 for a flat cable, a coupling portion 44 for fixing and having a pawl 44*a* in each of the sides of the tip end is formed by a resin or the like so as to be elastic, and integrally with the bottom portion of a first split case half 22 serving as the body of a case 21. A pressing elastic portion 41 which downward protrudes is formed on the bottom portion of the first split case half 22.

In the embodiment, the case 21 can be fixed by inserting the coupling portion 44 having the pawls 44*a* into a mounting hole (or groove) 16 of a housing of the apparatus or a circuit board 15. After the insertion, the pawls 44*a* at the tip end portions are engaged with the back side of the apparatus housing or the circuit board 15 by means of the elasticity of the resin or the like constituting the coupling portion 44, thereby preventing the anti-noise component 40 for a flat cable from slipping off. Furthermore, the disposition of the pressing elastic portion 41 on the case 21 enables the pressing elastic portion 41 to press the apparatus housing or the circuit board. Even when the apparatus housing or the circuit board is thin, therefore, the degree of rattling of the anti-noise component 40 can be reduced.

The other configuration, functions, and effects are identical with those of the first embodiment described above. It is obvious that the structure of the third embodiment can be applied to the second embodiment.

Figure 6:
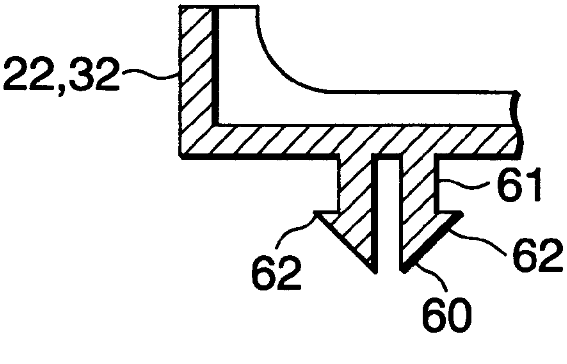
FIG. 6 is a section view showing a modification of a coupling portion disposed in a case.
Figure 7A:
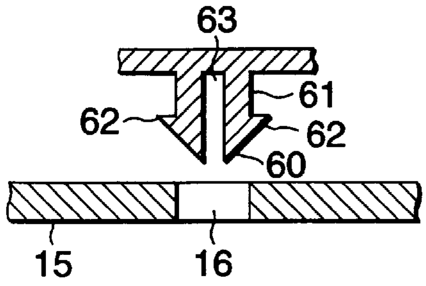
FIG. 7 is a view showing steps of attaching the coupling portion of FIG. 6 to a housing or a circuit board.
Figure 7B:
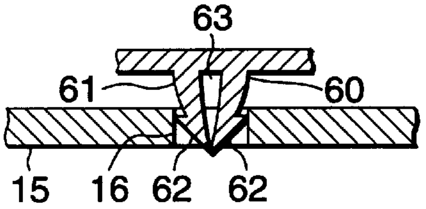
Figure 7C:
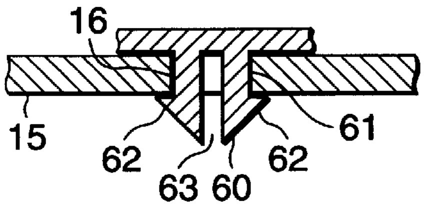
Figure 8:
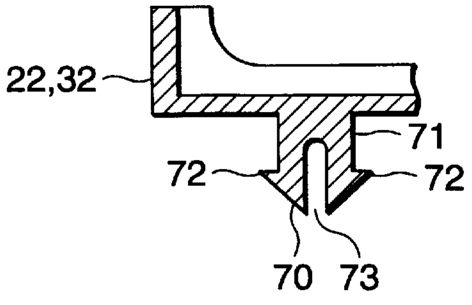
FIG. 8 is a section view showing another modification of the coupling portion disposed in the case.
Figure 9:
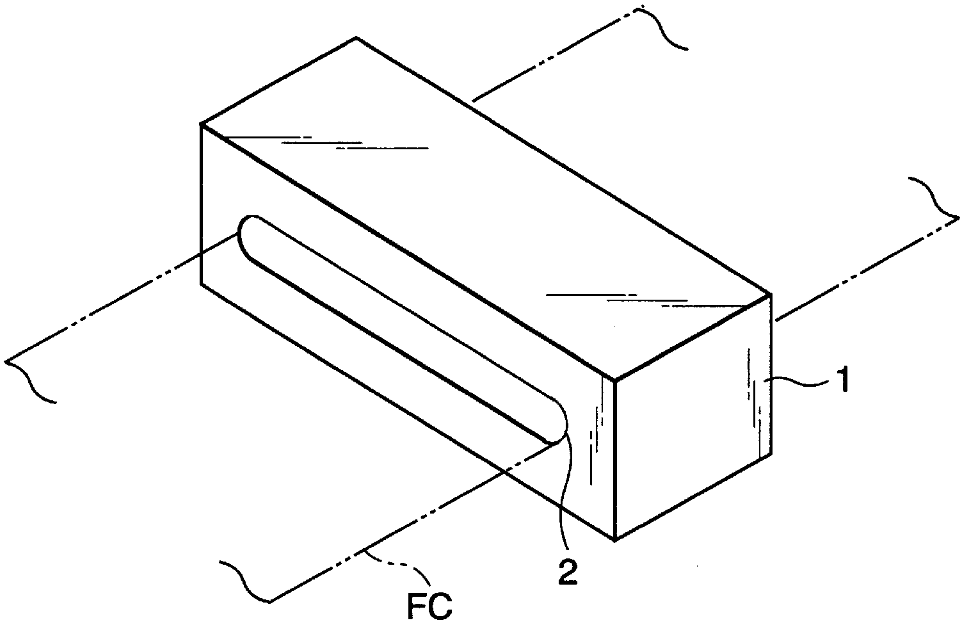
FIG. 9 is a perspective view showing the shape of a ferrite core used in an anti-noise measure for a flat cable.
Figure 10:
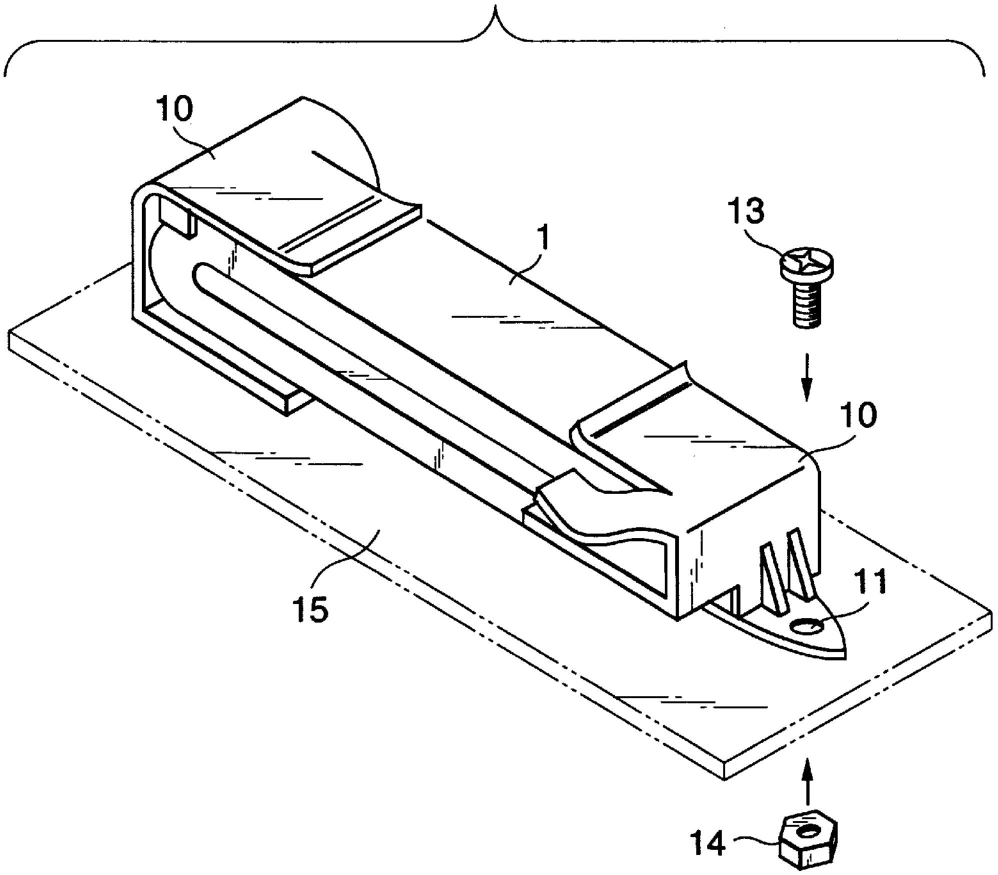
FIG. 10 is a perspective view showing a prior art example of a component which has been proposed and is commercially available and which is used for fixing a ferrite core for a flat cable.

FIGS. 6 to 8 show modifications of the coupling portions of the first to third embodiments.

Referring to FIG. 6, a coupling portion 60 is formed integrally with the first split case half 22 or 32. In the coupling portion 60, a pawl 62 is formed in each of the sides of the tip end of a columnar portion 61, and a slotted groove 63 reaching the basal part is formed in the axial direction of the columnar portion 61. In this case, the coupling portion 60 is inserted into the mounting hole (or groove) 16 of the apparatus housing or the circuit board 15 in the sequence of FIGS. 7A, 7B, and 7C, whereby the coupling portion 60 can be attached to the apparatus housing or the circuit board 15 easily and surely.

Referring to FIG. 8, in a coupling portion 70 integrated with the first split case half 22 or 32, a pawl 72 is formed in each of the sides of the tip end of a columnar portion 71, and a slotted groove 73 reaching a middle position is formed in the axial direction of the columnar portion 71, thereby providing the coupling portion with elasticity. The slotted groove 73 is required to reach at least a level where the pawls 72 are formed.

In the embodiments described above, the engaging portion for maintaining the first and second split case halves to be in a closed state is configured by the pairs of the engaging pieces 25 or 35 and the engaging holes 26 or 36. Alternatively, the engaging pieces may be formed on the first split case half, and the engaging holes in the second split case half. Another engaging or fitting structure or the like in which the case halves are detachably or openably disposed may be employed.

In the above, the embodiments of the invention have been described. It is obvious to those skilled in the art that the invention is not restricted to these embodiments and can be variously modified or changed within the scope of the claims.

As described above, the anti-noise component for a flat cable of the invention is configured so that the component comprises: a ferrite core having a slit-like hole through which a flat cable is to be passed; and an openable and closeable case which covers the ferrite core while the slit-like hole is exposed through the case, and the case integrally has a coupling portion for fixing to an apparatus on which the component is to be mounted. Therefore, the component has advantages that it can be easily fixed to a housing of the apparatus or a circuit board and the ferrite core can be easily attached or detached.

The anti-noise component for a flat cable can be fixed to the apparatus housing or the circuit board. Even when vibration or a shock is applied to the apparatus, therefore, the anti-noise component is not moved.

When the component is attached to or detached from a flat cable, the flat cable is not damaged. Therefore, the reliability can be enhanced and the workability can be improved.

What is claimed is:

1. An anti-noise component for a flat cable comprising:

a ferrite core having a slit-like hole through which the flat cable is to be passed; and a case which is openable and closeable to accommodate said ferrite core therein while said slit-like hole is exposed through said case, said case integrally having a coupling portion for fixing to an apparatus on which said component is to be mounted, wherein said case includes a first split case half, and a second split case half which is detachably disposed with respect to said first split case half, wherein the second split case half includes an engaging piece and the first split case half includes an engaging hole to receive the engaging piece so as to engage the first and second split case halves, and wherein the coupling portion comprises elastic pawls to be inserted into openings of the apparatus on which the component is to be mounted ane to be engaged with a back-side of the apparatus.

2. An anti-noise component as claimed in claim 1, further comprising:

a hinge portion through which said first and second split case halves are openably connected to each other, and the engaging piece and engaging hole are disposed on a face opposed to said hinge portion.

3. An anti-noise component as claimed in claim 1, wherein said ferrite core includes split core halves butted against each other.

4. An anti-noise component as claimed in claim 3, further comprising:

a pressing portion on a ceiling face of said second split case half to press said split core halves against each other.

5. An anti-noise component as claimed in claim 2, wherein said ferrite core includes split core halves butted against each other.

6. An anti-noise component as claimed in claim 5, further comprising:

a pressing portion on a ceiling face of said second split case half to press said split core halves against each other.

7. An anti-noise component as claimed in claim 1, further comprising:

an elastic portion, which protrudes toward the apparatus to which the component is to be mounted, on a bottom portion of the case.

8. An anti-noise component as claimed in claim 2, further comprising:

an elastic portion, which protrudes toward the apparatus to which the component is to be mounted, on a bottom portion of the first split case half.

9. An anti-noise component for a flat cable comprising:

a ferrite core including split core halves butted against each other and having a slit-like hole through which the flat cable is to be passed;

a case which is openable and closeable to accommodate said ferrite core therein while said slit-like hole is exposed through said case, said case integrally having a coupling portion for fixing to an apparatus on which said component is to be mounted; and a pressing portion on a ceiling face of said second split case half to press the split core halves against each other, and wherein the coupling portion comprises elastic pawls configured to be inserted into openings of the apparatus on which the component is to be mounted and to be engaged with a back-side of the apparatus.

10. An anti-noise component as claimed in claim 9, wherein said case includes a first split case half, and a second split case half which is detachably disposed with respect to said first split case half.

11. An anti-noise component as claimed in claim 9, wherein said case has a first split case half, a second split case half, and a hinge portion through which said first and second split case halves are openably connected to each other, and a closed state is maintained by an engaging portion which is disposed on a face opposed to said hinge portion.

12. An anti-noise component as claimed in claim 9, further comprising:

an elastic portion, which protrudes toward the apparatus to which the component is to be mounted, on the bottom portion of the first split case half.

13. An anti-noise component for a flat cable comprising:

a ferrite core having a slit-like hole through which the flat cable is to be passed;

a case which is openable and closeable to accommodate said ferrite core therein while said slit-like hole is exposed through said case, said case integrally having a coupling portion for fixing to an apparatus on which said component is to be mounted; and an elastic portion, which protrudes toward the apparatus to which the component is to be mounted, on a bottom portion of the case, and wherein the coupling portion comprises elastic pawls configured to be inserted into openings of the apparatus on which the component is to be mounted and to be engaged with a back-side of the apparatus.

14. An anti-noise component as claimed in claim 13, wherein said case includes a first split case half, and a second split case half which is detachably disposed with respect to said first split case half.

15. An anti-noise component as claimed in claim 13, wherein said case has a first split case half, a second split case half, and a hinge portion through which said first and second split case halves are openably connected to each other, and a closed state is maintained by an engaging portion which is disposed on a face opposed to said hinge portion.

16. An anti-noise component as claimed in claim 13, wherein said ferrite core includes split core halves butted against each other.

17. An anti-noise component as claimed in claim 16, further comprising:

a pressing portion on a ceiling face of the second split case half to press the split core halves against each other.

18. An anti-noise component as claimed in claim 14, wherein the elastic portion is disposed on the bottom portion of the first split case half.

19. An anti-noise component for a flat cable comprising:

a ferrite core having a slit-like hole through which the flat cable is to be passed;

a case including a first split case half, and a second split case half which is detachably disposed with respect to said first split case half and which is openable and closeable to accommodate said ferrite core therein while said slit-like hole is exposed through said case, said case integrally having a coupling portion for fixing to an apparatus on which said component is to be mounted; and an elastic portion, which protrudes toward the apparatus to which the component is to be mounted, on a bottom portion of the first split case half, and wherein the coupling portion comprises elastic pawls configured to be inserted into openings of the apparatus on which the component is to be mounted and to be engaged with a back-side of the apparatus.

20. An anti-noise component as claimed in claim 19, further comprising:

a hinge portion through which said first and second split case halves are openably connected to each other, and a closed state is maintained by an engaging portion which is disposed on a face opposed to said hinge portion.

21. An anti-noise component as claimed in claim 19, wherein said ferrite core includes split core halves butted against each other.

22. An anti-noise component as claimed in claim 21, further comprising:

a pressing portion on a ceiling face of the second split case half to press the split core halves against each other.

* * * * *